(12) United States Patent
Bat-Erdene

(10) Patent No.: US 12,709,488 B2
(45) Date of Patent: Aug. 18, 2026

(54) METHOD OF CONTROLLING A CONVEYOR SYSTEM AND A CONVEYOR SYSTEM

(71) Applicant: INNOMAC Sp. Z o.o., Suchodół (PL)

(72) Inventor: Khatansukh Bat-Erdene, Tarczyn (PL)

(73) Assignee: INNOMAC Sp. Z o.o., Suchodół (PL)

( * ) Notice: Subject to any disclaimer, the term of this patent is extended or adjusted under 35 U.S.C. 154(b) by 53 days.

(21) Appl. No.: 18/778,584

(22) Filed: Jul. 19, 2024

(65) Prior Publication Data

US 2025/0026582 A1 Jan. 23, 2025

(30) Foreign Application Priority Data

Jul. 21, 2023 (EP) .................................... 23461632

(51) Int. Cl.
*B65G 47/31* (2006.01)

(52) U.S. Cl.
CPC .................................... *B65G 47/31* (2013.01)

(58) Field of Classification Search
None
See application file for complete search history.

(56) References Cited

U.S. PATENT DOCUMENTS 6,715,598 B2 * 4/2004 Affaticati ............... B65G 47/31 198/444
9,592,965 B2 * 3/2017 Tsujimoto ............. B65G 43/10
2004/0241267 A1 12/2004 Schultz

FOREIGN PATENT DOCUMENTS

EP 3081513 A1 10/2016
JP 2007060936 A 3/2007
JP 2015231331 A 12/2015
WO 2008042294 A2 4/2008

* cited by examiner

*Primary Examiner* — Kavel Singh
(74) *Attorney, Agent, or Firm* — FisherBroyles, LLP; Ronni S. Jillion

(57) ABSTRACT

A conveyor system for products in batches, and a method of controlling the conveyor system. The conveyor system includes at least two conveyors connected in series and a controller. The controller is configured so that when the start conveyor is operating at the start speed, the first variable speed conveyor is operated at a high speed greater than the start speed, thereby transferring the batch of product from the start conveyor to the first variable speed conveyor while increasing the distance between the rows of products in the batch. The second and subsequent variable speed conveyor is operated at a high speed of the subsequent conveyor greater than the high speed of the corresponding preceding conveyor. The speed of each conveyor and its successive conveyor is decreased after the batch of products has fully departed from each conveyor onto each downstream conveyor.

13 Claims, 7 Drawing Sheets

METHOD OF CONTROLLING A CONVEYOR SYSTEM AND A CONVEYOR SYSTEM

The invention relates to a method of controlling a conveyor system and a conveyor system. The invention is particularly applicable to bakery production lines for flat corn or flour products, of the lavash type, especially tortillas, in which dough pressing with a press working in intermittent mode is used.

A well-known problem that arises in production lines of various applications is the lack of coordination of individual conveyors in a conveyor system, which translates into suboptimal use of the production line's potential. In particular, in many well-known production lines of flat baked food products, some stations operate in continuous mode, for example, the oven, and some stations in intermittent mode, for example, the press. This problem was tried to be solved, for example, by expanding the press system by increasing the number of presses in the press station to make their intermittent operation smoother.

On the other hand, intermediate conveyors between stations and ways to control them are known in the art, also partially solving the problems of non-optimal operation of the production line. For example, patent document WO18142180 A1 discloses a conveyor system for tortillas, which is adapted for transferring the product from a tortilla press to an oven. The press for tortillas outputs batches of product onto a press conveyor driven at the speed of the press. The oven then picks up batches of product on an oven conveyor driven at an oven speed that is slower than the press speed. The conveyor system for transporting tortillas is located between the press conveyor and the oven conveyor. The tortilla conveyor transfer system consists of a first conveyor, a second conveyor and a controller. The first conveyor is placed in series with the press conveyor and the second conveyor, and the second conveyor is placed in series with the first conveyor and the furnace conveyor. During operation, the controller controls and changes the speed of the first conveyor and the second conveyor.

However, the disadvantage of this system is that the proposed conveyor design and the control method of the conveyor system do not ensure even spacing between all rows of products transferred from the press to the oven. This ultimately affects the efficiency of the production line, and this translates into the cost of production and the final price of the product for the consumer.

In addition, in many well-known conveyor systems for tortillas, if a failure occurs, they are tedious and expensive to repair due to the complexity of their mechanical design.

Therefore, the purpose of the invention is to provide a conveyor system that would not have drawbacks as in state of the art and would ensure, with a very simple mechanical design, the uniform distribution of the product in all rows before they are fed into the baking oven.

According to the first embodiment, within the scope of the invention, a conveyor system is provided, in which each successive conveyor is shorter, and at least one controller is configured so as, when the start conveyor operates at the start speed V0, in the first step, to operate the first variable speed conveyor at a high speed of the first conveyor VH1 greater than the start speed V0, thereby transferring a batch of product from the start conveyor to the first variable speed conveyor, at the same time increasing the distance between rows of products in the batch; in the second step, to operate at least the second and subsequent variable speed conveyor (30, 40) at a high speed of the subsequent conveyor (VH2, VH3, . . . ), the high speed of the subsequent conveyor (VH2, VH3, . . . ) being greater than the high speed of the corresponding upstream conveyor (VH1, VH2 . . . );

in the third step, after the batch of product has fully departed from the start conveyor onto at least the first variable speed conveyor, to decrease the speed of the first variable speed conveyor to a low speed of the first conveyor VL1, the low speed VL1 of the first conveyor being lower than the target speed Vt; and in the fourth and subsequent step, after the batch of product has fully departed from each conveyor of the system onto its downstream conveyor to reduce the speed of said its downstream variable speed conveyor belonging to the system to a low speed of each downstream conveyor VL2, VL3, . . . , the low speed of said each its downstream conveyor being less than the target speed Vt but greater than the low speed VL1, VL2, . . . , of its upstream conveyor in order to transfer the batch of product from the first variable speed conveyor to at least the second variable speed conveyor and then to the target conveyor so that on the target conveyor the rows of products coming from the same batches and different batches have approximately the same distance.

Advantageously, when the system contains only two variable speed conveyors, at least one controller is configured to set the speed of the first conveyor and of the second conveyor, in the first step, in such a way that in the period t1P1 the first conveyor operates at the speed VH1 in fast mode and the second conveyor operates in slow mode at the speed VL2, then after the first period t1P1, in the second period t1P2 the first conveyor continues to operate at the speed VH1 in fast mode, and the second conveyor operates in fast mode at the speed VH2, the relationship between these speeds is described as follows: VP0<VH1<VH2, where VP0 is the speed of the conveyor preceding the conveyor system and to set the speed of the first and second conveyors in the second step in such a way that after the first conveyor and the second conveyor have moved a distance equal to the sum of their lengths L1+L2, within a time t1P1+t1P2 equal to the sum of the first and second periods, in the following third period t2P1, the first conveyor continues to move at speed VL1 and the second conveyor continues to move at speed VH2, and after the third period t2P1, in the fourth period t2P2, the first conveyor continues to move at speed VL1 and the second conveyor continues to move at speed VL2, while the relationship between these speeds is described as follows: VL1<VL2<Vt, where Vt is the speed of the target conveyor.

Advantageously, the system includes at least a third conveyor whose speed is constant and equal to the speed of the target conveyor.

Advantageously, the system includes at least a third conveyor whose speed is constant and less than that of the target conveyor.

Advantageously, each conveyor includes a belt (201, 301, 401) placed on elongated rollers attached to a support frame (202, 302, 402) to which an axle (205, 305, 405) connected by a drive belt to the rollers and connected to a servomotor, is attached.

Advantageously, the said controller is connected to other controllers and counters controlling at least the start conveyor and the destination conveyor.

Advantageously, the speeds VL1, VH1, VL2, VH3 are set according to the length L1 of the first conveyor and the length L2 of the second conveyor.

According to another embodiment, a method of controlling a conveyor system is provided within the scope of the invention. The method is characterized by the fact that in the conveyor system, each successive conveyor is shorter, and when the start conveyor operates at the start speed V0, the first step controls the first variable speed conveyor at a high speed of the first conveyor VH1 greater than the start speed V0, thereby transferring a batch of product from the start conveyor to the first variable speed conveyor, while increasing the distance between the rows of products in given batch;

in the second step, at least the second variable-speed conveyor is controlled at a high speed of the subsequent conveyor, the high speed of the subsequent conveyor being higher than the high speed of the corresponding preceding conveyor; in the third step, after the batch has fully departed from the start conveyor onto at least the first variable-speed conveyor, the speed of the first variable-speed conveyor is reduced to a low speed of the first conveyor VL1, the low speed VL1 of the first conveyor being lower than the target speed Vt; and in the fourth and subsequent step, after the batch has fully departed from each conveyor of the system onto its downstream conveyor, the speed of that downstream variable speed conveyor belonging to the system is reduced to a low speed of each downstream conveyor, the low speed of that each downstream conveyor being lower than the target speed Vt, but greater than the low speed of the preceding conveyor, in order to transfer the product batch from the first variable speed conveyor to at least the second variable speed conveyor and then to the target conveyor, so that on the target conveyor the rows of products coming from the same batches and different batches have approximately the same distance.

Advantageously, when the system contains only two conveyors, in the first step, the speed of the first conveyor and the second conveyor is set so that in the period t1P1, the first conveyor operates at the speed VH1 in the fast mode and the second conveyor operates at the speed VL2 in the slow mode, then in the second step, after the time t1P1 has elapsed, in the period t1P2, the first conveyor 20 continues to operate at the speed VH1 in the fast mode and the second conveyor operates at the speed VH2 in the fast mode, and the relationship between these speeds is described as follows: VP0<VH1<VH2, where VP0 is the speed of the conveyor preceding the conveyor system and in the third step, the speed of the first conveyor and the second conveyor is set such that, after the first conveyor and the second conveyor move a distance equal to the sum of their lengths L1+L2, within a time t1P1+t1P2 equal to the sum of the first and second periods, in the subsequent third period t2P1, the first conveyor continues to move at speed VL1 and the second conveyor continues to move at speed VH2, while in the fourth step, after the third period t2P1 has elapsed, in the fourth period t2P2, the first conveyor continues to move at speed VL1 and the second conveyor continues to move at speed VL2, the relationship between these speeds being described as follows: VL1<VL2<Vt, where Vt is the speed of the target conveyor.

The idea behind the construction of the conveyor system and the method of its control according to the invention is to ensure that the distance between the tortilla cakes is systematized on the path from the press to the oven.

By placing at least two conveyors between the press and the oven, an additional conveyor section is obtained, where it is possible to rearrange the products flattened by the press into evenly spaced rows before feeding them into the oven.

Furthermore, by ensuring that each intermediate conveyor has a higher speed compared to that of the preceding conveyor and by changing the speed of these conveyors from higher to lower, it is possible to increase the distance between batches of cakes when intercepting batches of cakes first falling from the press conveyor and then from the first intermediate conveyor onto the second and subsequent intermediate conveyor.

Thanks to the simple mechanical design of the conveyor system, with minimal electronic components and no sensors, it is easy to maintain and repair the system.

Many of the advantages also comes from the possibility of using a third intermediate conveyor, which operates at a constant speed lower than that of the oven, so as to achieve another speed difference between the oven conveyor in contact with it and ensure that the distance between each successive row of products is increased before they enter the oven.

By using conveyors with a very simple mechanical design and a simple drive, the cost of maintaining the conveyor system is reduced, as well as the time necessary for its repair.

The method of controlling the conveyor system and the conveyor system for dough cakes according to the invention is shown in detail in the embodiments with reference to the attached figures of the drawing, where:

Figure 6:
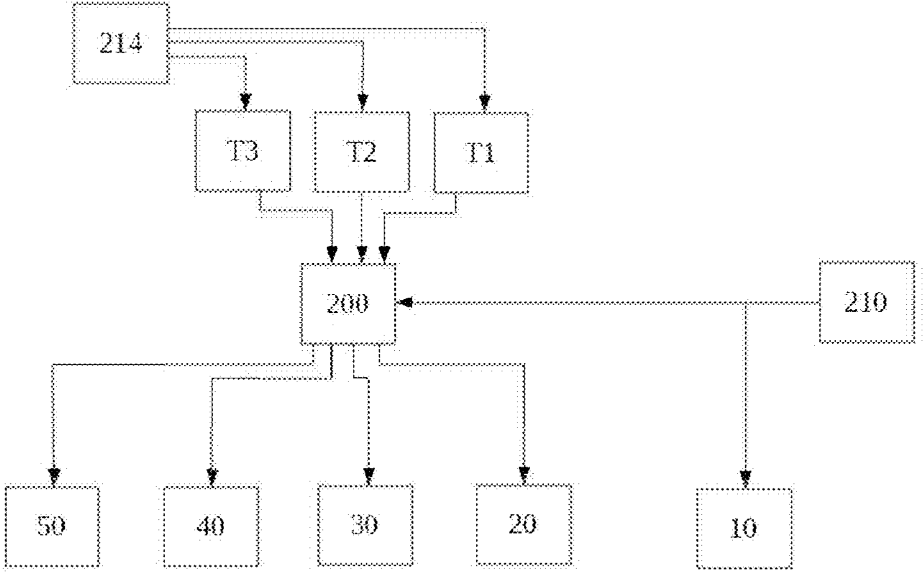
Figure 7A:
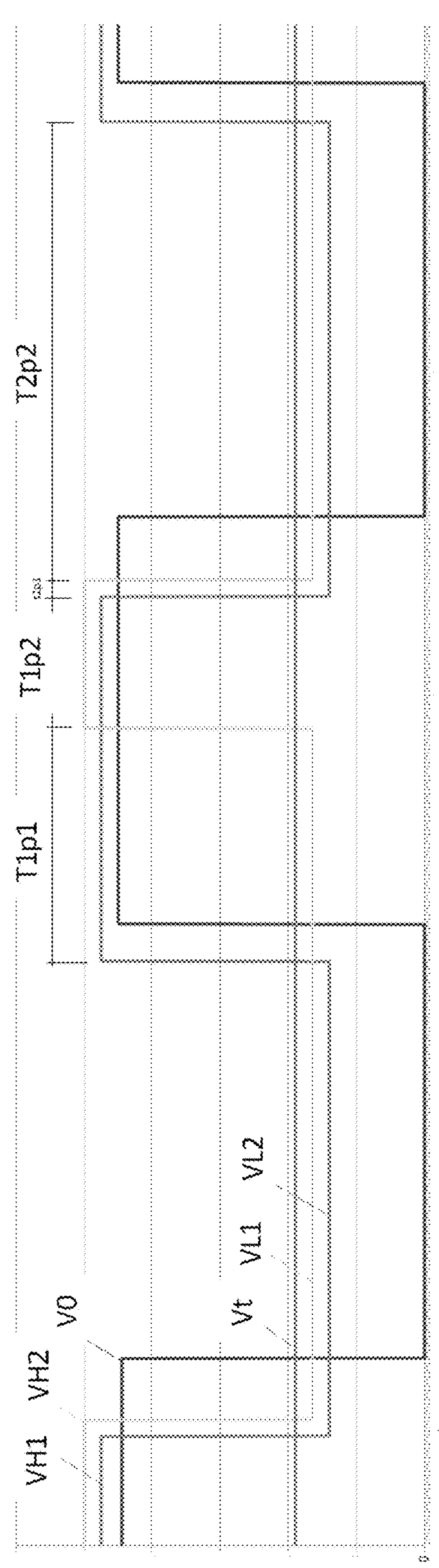
Figure 7B:
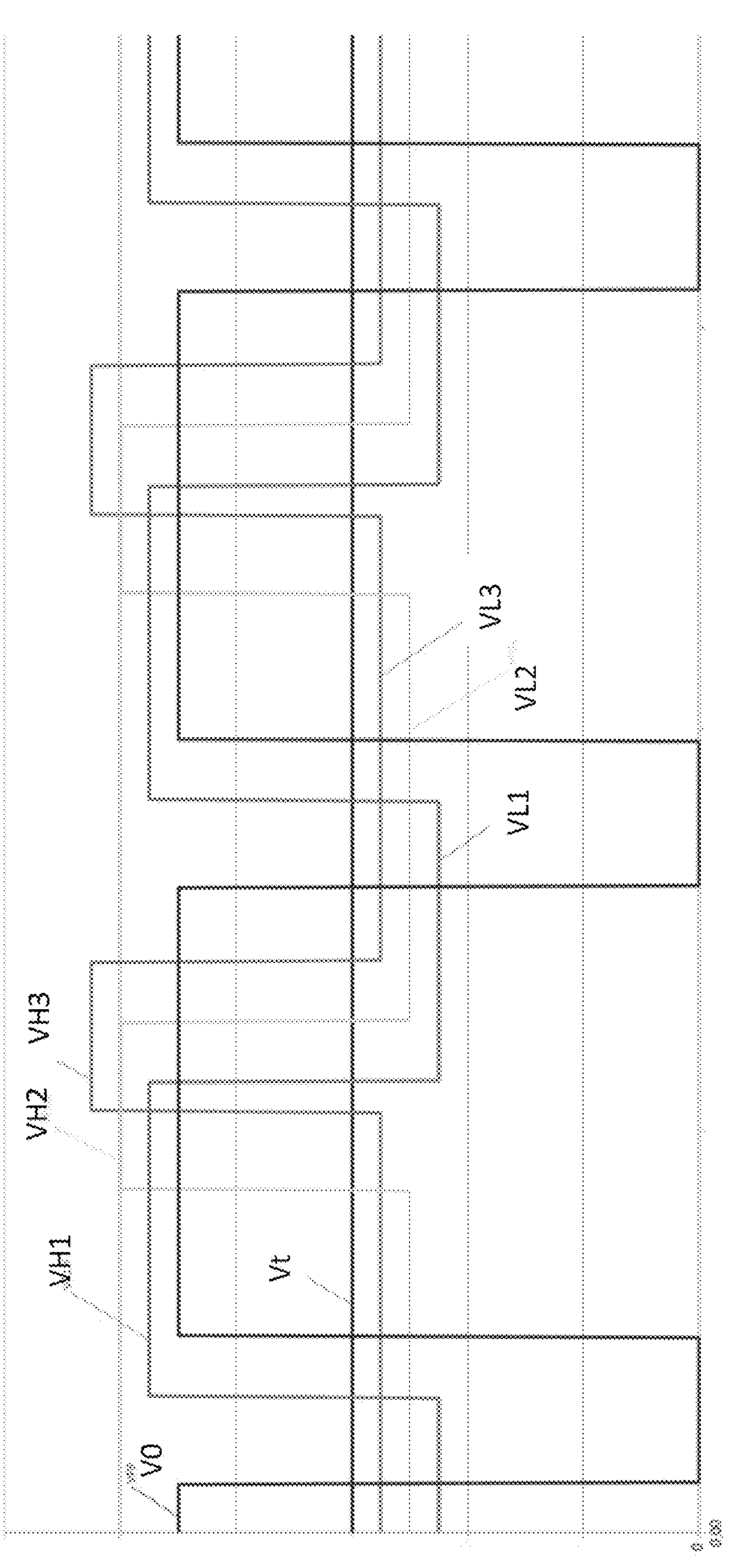
Figure 8:
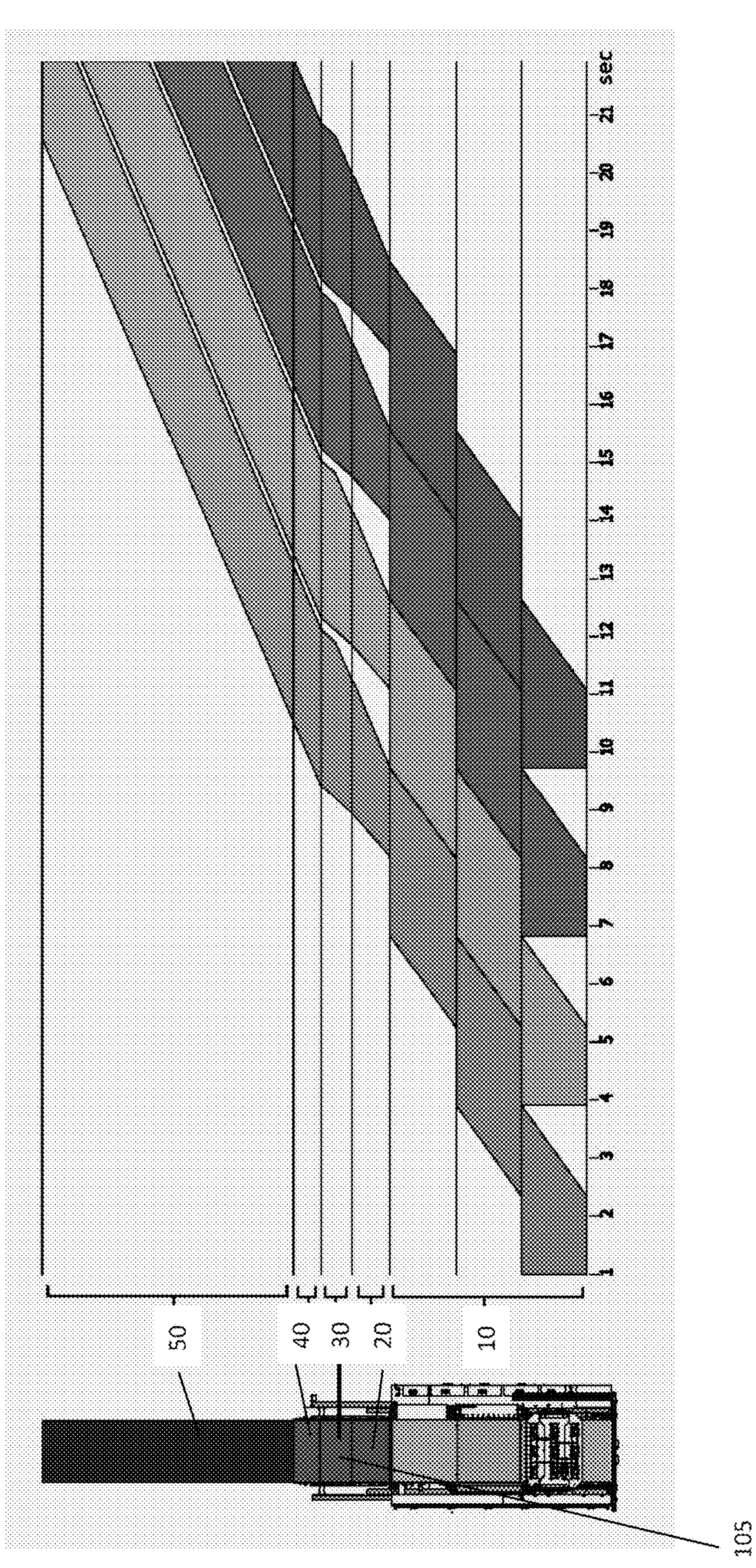

FIG. 6 block diagram of the control system;

FIG. 7A shows a time diagram of the speed control of a conveyor system with two conveyors according to the first embodiment of the invention;

FIG. 7B shows a time diagram of the speed control of a conveyor system with three conveyors according to the second embodiment of the invention;

FIG. 8 shows a graph of product position as a function of time along the production line;

The conveyor system according to the invention can work with any production line where there is a need to move products from a conveyor operating in start-stop mode to a conveyor operating in continuous mode, while maintaining an uniform distribution of products. In particular, the conveyor system according to the invention is suitable for a production line of food products having the form of a flat dough cake, where there is a need to transfer the dough cakes from a press operating in start-stop mode to an oven operating in continuous mode, with alignment of the gap between rows of dough cakes, in particular with a tortilla production line.

Figure 1:
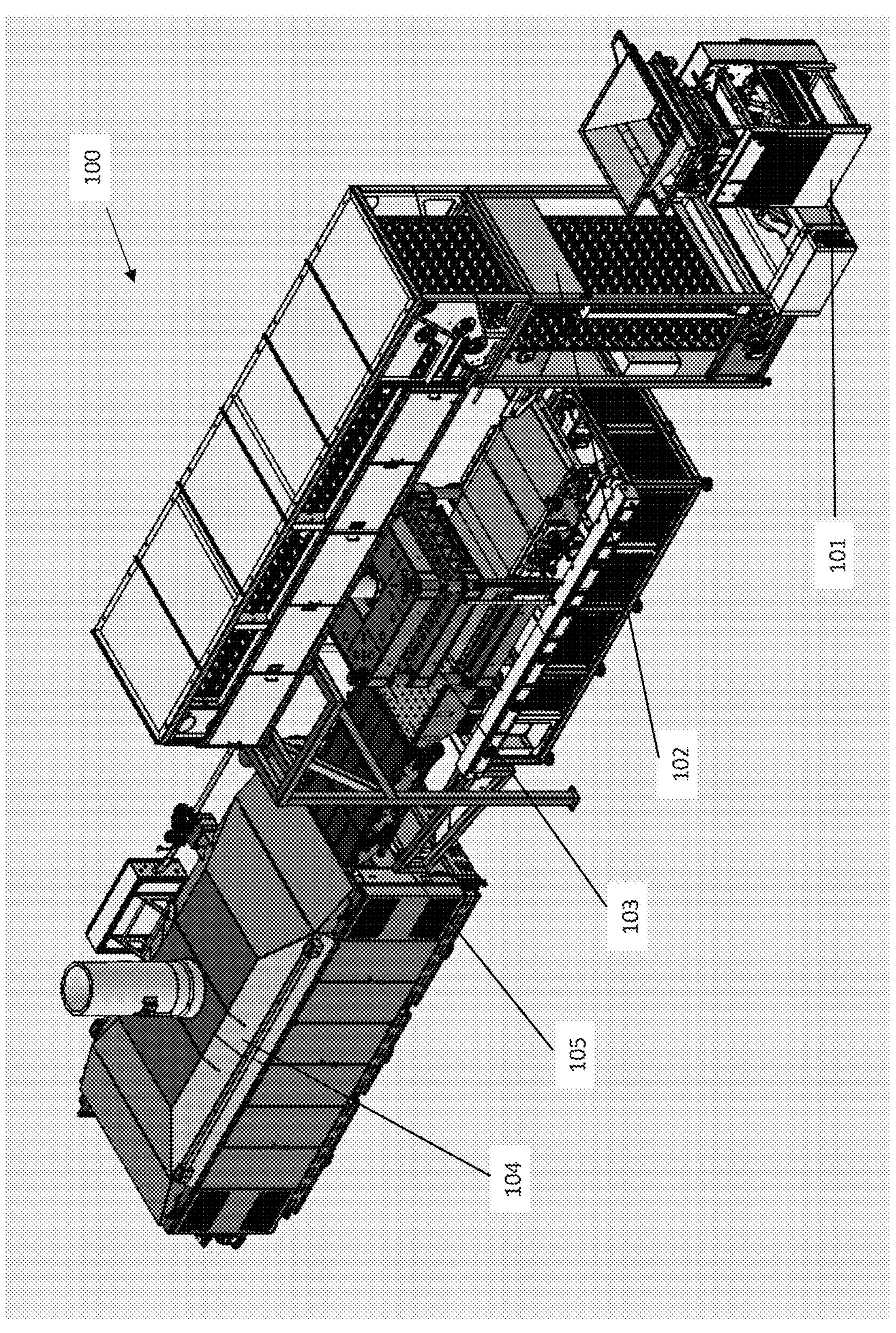
FIG. 1 shows general perspective view of a tortilla production line according to the invention with a proofing machine and a divider.

As shown in FIG. 1, the conveyor system 105 according to the invention can be part of 100 production line of flat dough products, in particular a production line for baking tortillas. A typical tortilla baking production line consists of a divider 101, a proofing machine 102, a press 103, and a baking oven 104. The listed machines (stations of the production line) are connected to each other by a system of conveyors that perform functions integrating the individual phases of tortilla production in the process line. The conveyor system ensures proper performance of the entire production line.

Figure 2:
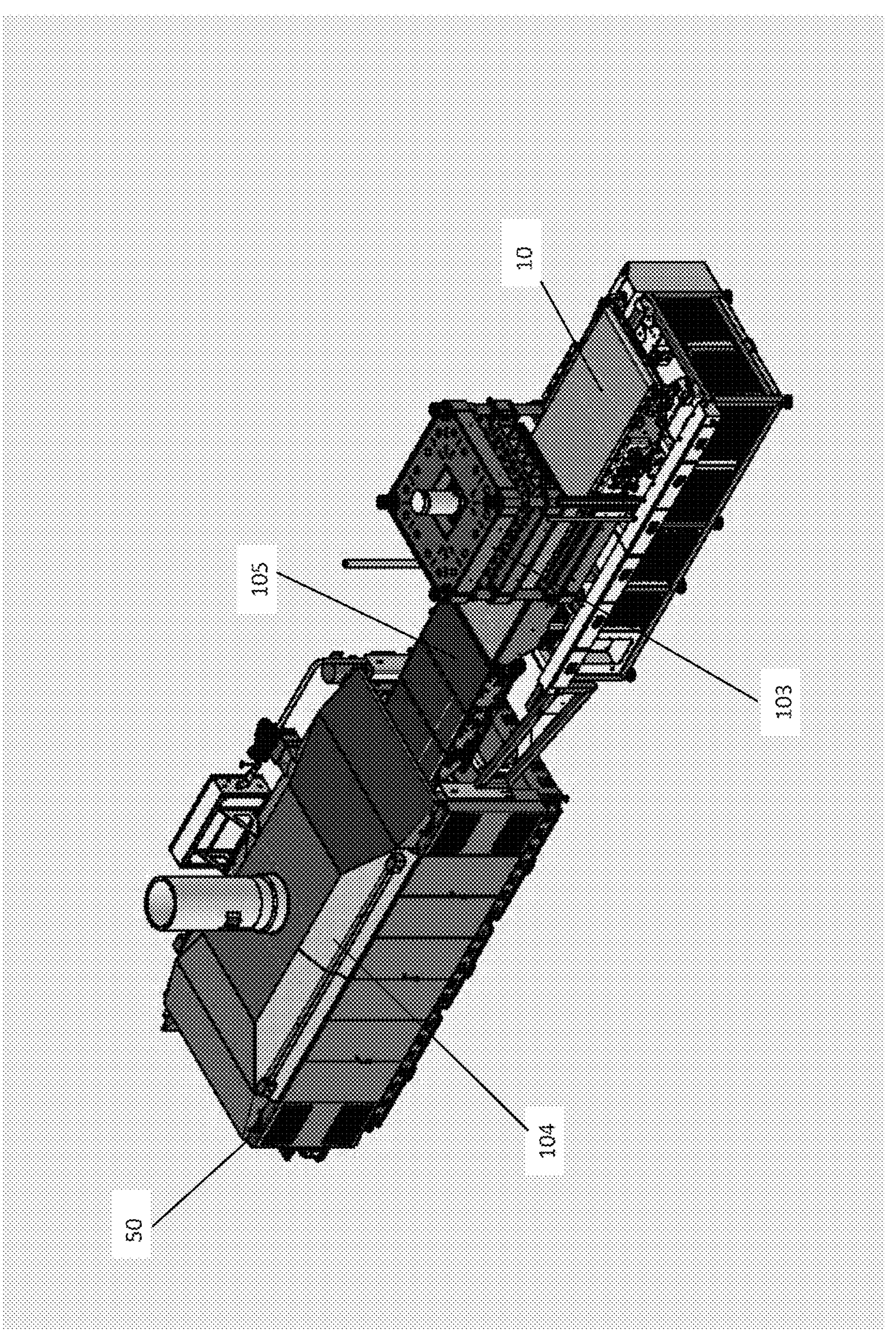
FIG. 2 shows a perspective general view of a tortilla production line according to the invention without a proofing machine and dough dividing machine.
Figure 3:
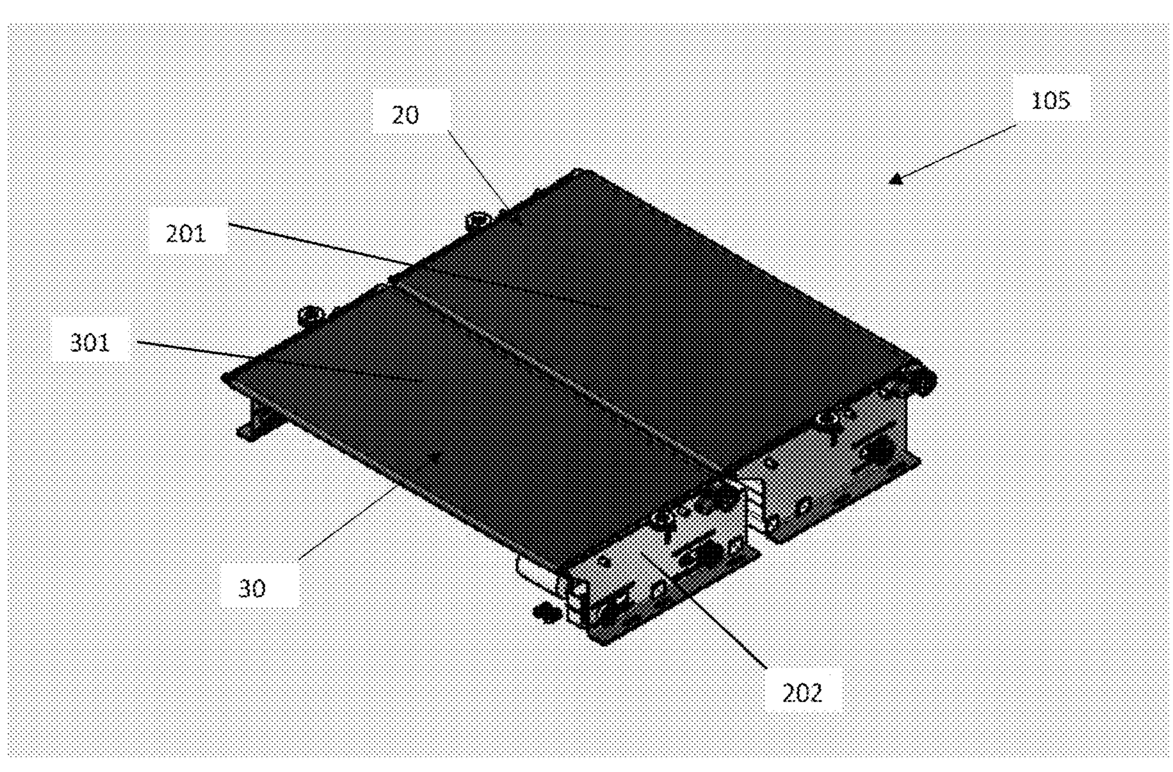
FIG. 3 shows a perspective general view of a sequential conveyor system with two conveyors according to the first embodiment of the invention.

The dough divider 101 is a machine that divides dough and forms dough balls of a specific weight. Another station of the tortilla production line is the proofing machine 102, whose function is to hold the dough for proper rising. For this purpose, the dough usually stays in this section for 5 to 10 minutes after which it is positioned and fed onto the loading conveyor 10 of the 103 press (as shown in FIG. 2). The press 103 is another station of the production line 100, whose task is to flatten the dough balls that have risen in the proofer 102 into cakes. Advantageously, the 103 press is a dough ball pressing device operating in start-stop mode. That is, press 103 works in cycles, flattening a certain number of dough balls (a batch of dough balls) at a time, which are located between the lower and upper plates of the press in a given cycle. A typical press suitable for the production of tortillas simultaneously presses a minimum set of 2 balls in 2 rows evenly distributed on a conveyor 10, after exiting the proofing machine 102. The largest such presses suitable for flattening tortillas. simultaneously press a set of 5 balls of dough in 5 rows. Each batch for the same press will generally consist of the same number of dough balls arranged in a similar pattern. As mentioned, the number and placement of dough balls may vary for other presses.

Press 103 includes an upper plate mounted on an upper support frame and moves vertically up and down to press batches of dough balls against the lower plate. In each cycle, the top plate is initially raised to move a flattened batch of tortillas out of the press and bring a new batch of dough balls under the press. Then, in each cycle, the top plate is lowered to flatten the dough balls. Depending on the requirements, the lowering time of the top plate of the press 103 to the lowest position, depending on the distance from the initial position of the top plate, ranges from 0.5 to 0.7 s.

The movement of the press flattening the cakes is performed only when the press conveyor 10 is stopped. Accordingly, the press conveyor 10 also cycles in start-stop mode. For example, the required stopping time for a press conveyor varies from 0.5 seconds to 2.5 seconds. Advantageously, the press can be a hot press, providing pre-toasting of the dough. The hot pressing process, due to its advantages for the subsequent properties of the dough during baking, is commonly used in the production of tortillas. In this case, another parameter of the 103 press cycle is also tuned, i.e. the time at which the two plates are spaced at a minimum distance from each other, so as to ensure effective and sufficient heat transfer to the dough being flattened. In other words, the operation of the 103 press involves a compression period (during which the pressure plates are set at the desired spacing), followed by a holding period (during which the plates are held at the desired spacing).

Similarly, the duty cycle of the press conveyor 10 is optimized. The range of the target operating speed of the conveyor 10 of the 103 press with pre-baking (hot pressing) function, is between 0.8 m/s and 1.1 m/s, depending on the surface area of the press plate of the 103 press and the weight of the cakes to be baked. Press speed is generally chosen as the fastest possible speed of the press conveyor. When the conveyor speed is too high, the tortillas on the conveyor belt of the press 10 begin to slip and overlap. In general, the time required to open and close the press and move the belt that feeds the dough under the press severely limits production efficiency. A typical press with its conveyor makes 15 to 25 cycles per minute.

In a production line with a single press, the press conveyor moves the pressed pieces in a cyclic manner, requiring delays when new dough balls are fed into the press and pressed cakes are removed from the press. In other words, due to the start-stop mode of conveyor operation imposed by the press type, sets (batches) of several rows of cakes are output at the exit of conveyor 10 of press 103. Between these sets (batches) of cakes, gaps larger than the distances between rows of cakes appear in one pressed set. Consequently, in the case of continuous operation of conveyor 13 of the next station of the production line, which is bakery oven 104, the whole process is not optimal.

Typical oven conveyor 50 speed (FIG. 2) ranges from 0.6 m/s to 0.7 m/s, depending on the power of the bakery oven. Typically, tortilla slices stay in the oven for 20 to 30 s, for a 300 kW 104 bakery oven.

As shown in FIG. 2, according to the invention, there is an additional conveyor system 105 between the press station 103 and the baking oven 104, which includes at least two sections (two conveyors 20, 30, 40 (feeders) connected in series). Since the cakes leave the press in cycles with specific time intervals during the production process, the role of the additional conveyor system according to the invention is to ensure a smooth flow of cakes from the press 103 to the oven 104 while forcing an uniform and repeatable distribution of cakes at the entrance to the bakery oven. In other words, the 105 conveyor system according to the invention, thanks to its design and the way it is controlled, changes the cyclic movement of the product into a flow of a constant speed and a constant distance between successive cakes, enabling the high-speed 10 "start-stop" conveyor to be connected to the slow-speed conveyor 50 of the bakery oven.

In the course of research work and experiments, it was found that achieving a perfectly equal distance between all consecutive rows of cakes, regardless of whether they come from the same batch or are from two different batches, is not achievable in practice. However, it is possible to achieve a quasi-such dependence in a system with a start-stop press. To force this type of cake flow with a constant velocity and approximately constant distance between successive rows of cakes within the same batch and within successive batches of cakes, the next batch of products must move at higher velocities, that is VP0 VH1, VH2 . . . etc., while the previous batch of products must move at lower velocities, that is VL1, VL2, VP0 . . . etc.

The term batch of cakes should be understood as several rows of cakes pressed simultaneously within one press cycle.

The term 'previous batch' ('first batch') means, at a particular point in time Tx, the second batch from the press side of two adjacent batches of cakes, with this previous batch having just passed the first conveyor 20 of the system according to the invention in its entirety and its last row of cakes having just entered the second conveyor 30 according to the invention.

The term 'next batch' ('second batch') means, at the same specific moment in time Tx, the first batch on the press side of two adjacent batches of cakes, while this next batch having just filled with itself the first conveyor 20 of the system according to the invention in its entirety and in a moment its first row of cakes will enter the next conveyor of the system according to the invention.

In the course of traveling on carriers moving with respectively set lower speeds VL1, VL2, VP0 . . . and higher speeds VP0 VH1, VH2 . . . the distance between the batches—the previous and the next one—decreases. When the distance Lx is small enough to be considered acceptable and when the end of the previous batch (catched-up batch one), that is, the last row of this batch, leaves the first conveyor 10 or the subsequent conveyor 20,30 then it is possible to change the speed in the transporter 10 or 20, 30 left by this batch to a lower one for the next batch (catch-up batch) already present on it. However, as the batches approach each other, up to the moment Tx described above, the two batches, at any moment in time, must be on at least two different conveyors. To meet the above requirement, one needs to use the right number of transporters for specific parameters: NAO, Tp, VL1, VL2 . . . , VH1, VH2 . . . . And each successive conveyor should be shorter and shorter.

Figure 5:
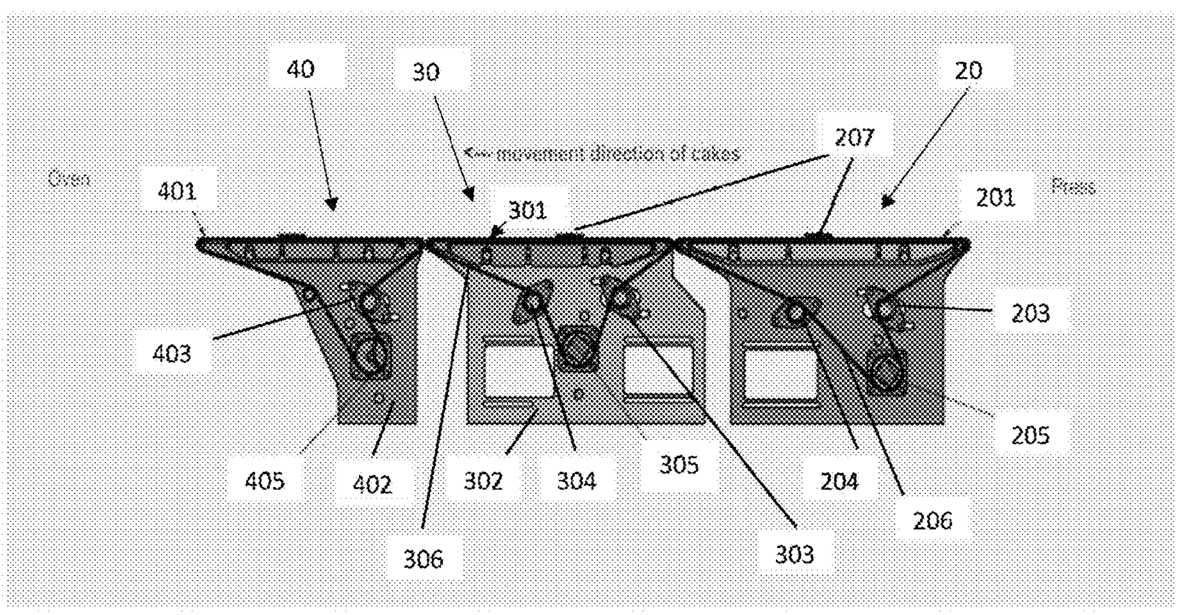
FIG. 5 shows a side view of the sequential conveyor system according to the invention.

As shown in FIG. 5, in one embodiment, the 105 conveyor system according to the invention includes two conveyors 20,30 (also called transporters 20, 30) connected in series. In addition, the first conveyor 20 is adapted to be placed in series with a start conveyor which precedes it (here a transporter 10 of the press 103, downstream which the system 105 is attached, while the last conveyor 30 of at least two conveyors is adapted to be placed in series with the target conveyor (here conveyor 50 of the furnace 104) upstream which the system 105 is attached. The first and second conveyors are very close to each other so as to ensure a smooth flow of tortilla cakes without the dough falling between conveyors 20, 30. The first conveyor 20 (on the side of the press 103) contains a belt 201 placed on elongated rollers attached to a support frame 202. The belt 201 of the first conveyor 20 is endless. The 201 conveyor belt is made of a material suitable for contact with food, for example, it can be made of polyacetyl resin (POM). The belt 201 of the first conveyor can also be in the form of a steel mesh. A tension roller 203, a tension roller 204 and an axle 205, respectively, around which the first drive belt 206 is routed, are mounted to the support frame 202. Attached to axis 205 is the first servomotor (not shown). Torque from the first servomotor of the first conveyor 20 is transmitted to the axle 205, thus driving the drive belt 206. Additional rollers 207 located at the height of the movable belt 201 ensure stable positioning of the belt 201 and drive belt 206 during movement.

Similarly, the second conveyor 30 (on the side of the press 103) contains a belt 301 placed on elongated rollers attached to a support frame 302. Belt 301 of the second conveyor 30 is endless. Belt 301 of the second conveyor 30 is made of a material suitable for contact with food, for example, it can be made of polyacetyl resin (POM). Belt 301 of the second conveyor can also be in the form of a steel mesh. A drive roller 303, a drive roller 304 and an axle 305, respectively, around which a second drive belt 306 is routed, are mounted to the support frame 303. A second servomotor (not shown) is attached to the 305 axis. Torque from the second servomotor of the second conveyor 30 is transmitted to the axle 305 thus driving the second drive belt 306. Both the first servomotor and the second servomotor are connected to the controller (not shown).

The conveyor system according to the invention does not contain sensors. In such embodiment, the controller 200 manages the transfer of each batch of tortillas based on the sequential control of the drive of the first as well as the second conveyor 20, 30, ensuring the expected position for each batch of tortillas. Since the press system operates in cycles, an important issue is the proper selection of the on and off times of the conveyor drives 20, 30 and the selection of their speeds to synchronize their operation with the press conveyor 10 and the furnace conveyor 50. For this purpose, the 200 controller includes a series of T timers for determining the expected batch position along the conveyor system 100. Such timers can be implemented in the controller either in hardware or software, depending on the version of the available controller 200. Each timer T1, T2, T3 can be programmed in memory 214. In addition, the controller 200 is provided with digital and/or analog inputs, respectively, as well as digital and/or analog outputs for communication with the environment, including the controllers of the conveyor 10 of the press and conveyor 50 of the furnace.

The first intermediate conveyor 20, with a length of L1, moves at two speeds, i.e. in fast mode with a speed VH1 and in slow mode with a speed VL1, where VH1>VL1. The VH1 speed in high-speed mode is slightly higher than the VP0 speed of the press conveyor (VH1>VP0), thus increasing the distance between the rows of transported cakes within single batch accordingly, preventing their possible overlapping after the pressing operation, and allowing the press conveyor to unload. Advantageously, the increase in spacing within a batch is less than 15%, even more advantageously less than 10%, due to the need to optimize the packing of cakes on the target conveyor, i.e. conveyor 50 of the oven.

Like the first conveyor 20, the second conveyor 30 with L2 length also moves at two speeds, i.e. in fast mode at speed VH2 and in slow mode at speed VL2. The length of the conveyor L2 is less than the length of the conveyor L1.

The speed VL1 of the first conveyor 20 in slow mode is slower than the speed VL2 of the second conveyor 30 in slow mode, and enables the cakes to be smoothly loaded onto conveyor 50 of the baking oven.

The speed VH2 of the second conveyor 30 in high-speed mode is slightly higher than that of conveyor 20 in high-speed mode VH1 and allows full unloading of the press conveyor, since the combined length of conveyors 20 and 30 (L1+L2) corresponds to the length of press conveyor 10 (L) plus the necessary required spacing between tortilla rows.

As mentioned earlier with regard to FIG. 5, typically, the drives of intermediate conveyors 20, 30 are geared motors, which make it possible to achieve smooth control of the speed of conveyor travel over a wide range.

As shown in FIG. 7A, along with feeding the signal of switching on the run of the conveyor 10 of the press 103, issued at the digital output of the press controller 210 to the digital input of the controller 200, the timer T1 is started, measuring the the operating time t1P1 of the conveyor drive 20 at speed VH1 in fast mode. With the start of the T1 counter, a high signal is issued at the digital output of the controller 200 to start the drive of the first conveyor 20 in fast mode. Once the operating time t1P1, set in the T1 counter, required to move the cakes along the entire length L1 of the first conveyor 20 has elapsed, the second conveyor 30 is switched to fast mode. The second conveyor then operates at speed VH2 for time t1P2 measured by the next timer T2 of the controller 200. The unloading of conveyor 10 of press 103 continues. When the timer T2 is started, a high state is issued on the next digital output of the controller 200, which is responsible for controlling the drive of the second conveyor 30. After conveyors 20 and 30 have moved a distance equal to the sum of their lengths L1+L2, at time t1P1+t1P2, their speeds are switched to slow mode, lasting t2P1 and t2P2, respectively. At time t2P1, the first conveyor moves at speed VL1 and at time t2P2, the second conveyor moves at speed VL2, the relationship between these speeds being described as follows: VL1<VL2<Vt, where Vt is the speed of conveyor 50 of 105 furnace. Timing t2P1 and t2P2 is accomplished via another timer T3 of the controller 200, which issues a low or high state, respectively, of the digital output responsible for controlling the drives of conveyors 20 and 30. In this mode proceeds smooth loading of the oven 105 conveyor 50 with tortillas for baking, with fixed gaps between rows of pancakes.

Thus, the operation of conveyors 20, 30 is realized sequentially through drives controlled by a controller 200 equipped with timers T1, T2 and T3, requiring no additional external feedback signals from other sensors.

The control parameters are selected according to such parameters as: specific moments of time during the press 103 cycle, the speed of the press conveyor, the speed of the oven conveyor, as well as the length of the first conveyor 20 and the length of the first conveyor 30.

Depending on the configuration, the length of the first conveyor 20 can range from 0.6 m to 0.7 m, the length of second conveyor 30 can range from 0.35 m to 0.6 m, the third conveyor from 0.2 m to 0.5 m and an optional fourth conveyor from 0.4 m to 0.6 m.

As a general rule, the first conveyor 20 operates so that its initial speed, that is, VH1 in fast mode, is greater than the operating speed of the press conveyor VP0, and then decreases to a speed VL1, which is lower relative to the speed Vt of the furnace conveyor (furnace grate). Similarly, the initial velocity of the second conveyor V1*p*2 is greater than the velocity of the first conveyor and decreases in time also to a velocity less than that of the furnace conveyor (furnace grate). By changing the speed of cake travel at least twice, from higher than the speed of the press conveyor to lower, smooth cake travel is achieved while ensuring the flow of tortilla cakes without interruption. Changes in the operating speed of the two conveyors 20, 30 occur when a batch of cakes is picked up from the preceding conveyor. As a result, tortilla slices gain an even continuous distribution after passing through the two conveyors 20 and 30, so the conveyor 50 of the oven 104 (the oven grate) can be located right behind them. The speeds VL1, VH1, VL2, VH3 are set according to the used length L1 of the conveyor 20 and length L2 of the conveyor 30, and these lengths are also within such ranges, so that it is possible to give the conveyors a safe speed that is not harmful to the products and, moreover, achievable. Furthermore, according to the invention, the length of the next conveyor in the conveyor chain of the system 105 is less than the length of the preceding conveyor. As shown in FIG. 8, the speeds of successive conveyors in a given cycle are correlated with each other in such a way as to be able to vary the spacing between products as a function of the distance traveled along the conveyor system. FIG. 8 shows three consecutive work cycles. With a given length of conveyors L1, L2 visible on the vertical axis, products move on successive conveyors at a speed illustrated by the slope coefficient of the curves, for products located in the extreme on a given conveyor, resulting from the position of products as a function of elapsed time. In FIG. 8, one can observe the effect of an even distribution of products at the end of the second conveyor 20, after they have traveled the length L1+L2.

The cycle of unloading a batch of cakes from under the press is repeated when the press 103 unloading conveyor 10 starts again.

As mentioned earlier, synchronization of the operation of the individual conveyors 20 and 30 with each other within the conveyor system 100 according to the invention and with the press 103 and the furnace, is ensured by signals supplied to the controller 200 by other controllers and counters. In one embodiment (not shown), the controller can be single and control all the conveyors along the production line.

As mentioned, the control method of the conveyor system according to the first embodiment consists in that at time t1, conveyor 10 of the press 103 starts to move after coming to a complete stop.

Figure 4:
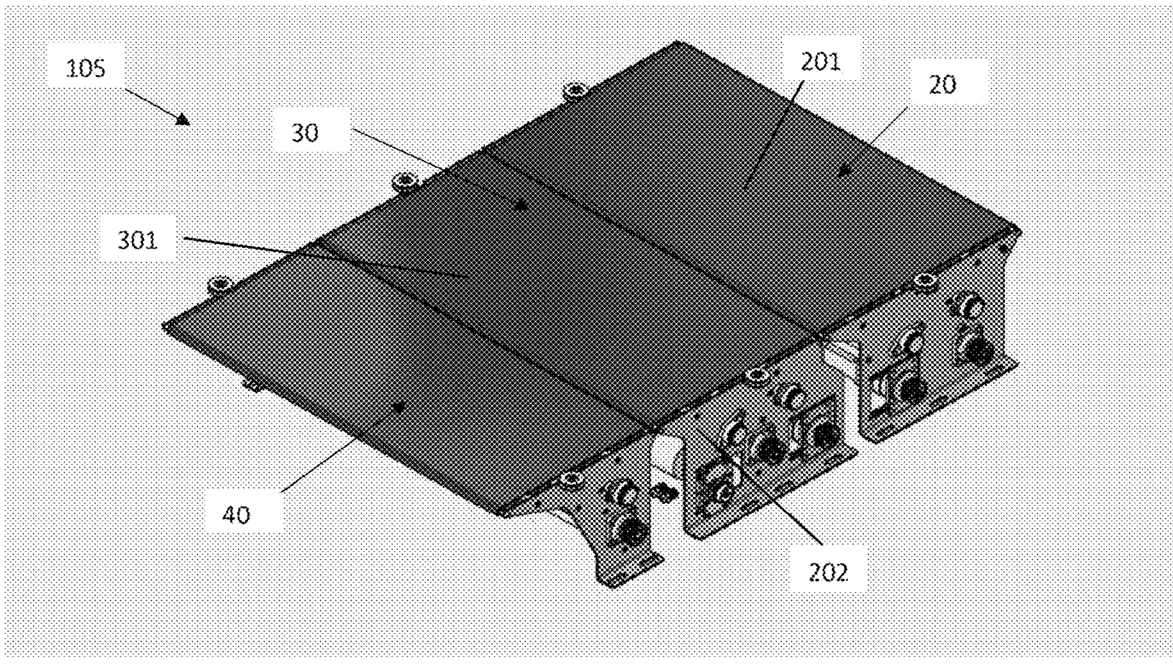
FIG. 4 shows a perspective general view of a sequential conveyor system with three conveyors according to the second embodiment of the invention.

As shown in FIG. 4 in another embodiment, the conveyor system according to the invention contains three conveyors connected in series. The construction of the third transporter 40 is identical to the second transporter 30.

The presence of each successive conveyor above the two discussed above in the conveyor system according to the invention, can have different causes. One of the reasons why more than two conveyors are used is the need to adjust the length of the entire conveyor system to the existing arrangement of other stations of the bakery machine and the need to ensure adequate safety and production quality conditions along this section.

In one embodiment, the control of three conveyors 20, 30,40 can be identical to the first embodiment, i.e. an uniform flow of cakes without interruptions is achieved already after the second conveyor 30. Further on, the cakes move along belt 401 on a third conveyor 40, which in one embodiment acts as an extension of the cake transport track into the oven, when the ambient temperature in the immediate vicinity of the oven entrance threatens t the durability of the servomotor-controlled conveyors. In this third conveyor 40, torque from the gearmotor is transmitted to the axle 405 and then to the belt 406, moving the cakes in a linear motion at constant speed less than that of the conveyor 50 of the furnace 104. In such embodiment, another speed differential is created at the junction of the third intermediate conveyor 40 and the oven conveyor 50, allowing increasing the distance between each successive row of cakes before they are fed into the oven. This also avoids the edges of the cakes being wrapped around and coming into contact with each other.

Belt 401 of the third conveyor 40 is endless. Belt 401 of the third conveyor 40 is made of material suitable for contact with food, and resistant to temperature, for example, it can be made of steel mesh. In an alternative variation, the speed of the third conveyor 40 can be equal to the speed of conveyor 50 of furnace 104.

A second reason for using more than two conveyors is the need to adapt the conveyor system according to the invention to the capacity of the press. Various bakery machines use presses of different sizes and capacities.

During the study, it was noted that two conveyors may not be sufficient to adequately evenly distribute the rows of cakes coming from a single pressed batch. The greater the capacity of the press and its overall dimensions, the greater the number of conveyors in the system according to the invention should be used.

As mentioned earlier, it was determined that the number of conveyors in the system according to the invention should be adjusted each time according to the press and other parameters of the bakery machine station with which it is to cooperate. The number of conveyors in the system according to the invention is generally dependent on the pressing time: Tp, all slow speeds: VL1, VL2 . . . , all high-speeds: VH1, VH2 and the Smallest Acceptable Spacing (SAD) between outgoing batches of cakes. The conveyor system's task is to ensure that the next batch of cakes catches up with the previous one by providing the smallest acceptable spacing between them (SAD). This spacing, in one embodiment, is equal to the base spacing dp between rows in a batch that is pressed by the press. In another embodiment, the spacing is larger than the basic spacing dp between rows in a batch that is pressed by the press, but not by more than 15%.

For this purpose, the next batch moves at higher speeds, that is, VP0 VH1, VH2 . . . while the previous batch moves at lower speeds, that is, VL1, VL2, VP0 . . . . During the course at these speeds, the distance between batches decreases, and when it is small enough to be considered acceptable and when the end of the first batch (the previous batch) leaves the starting transporter 10, one can start with moving from higher to lower speeds for the next batch in turn, starting from the first transporter 20. However, as the batches approach each other, up to the point described above, the two batches, the catching up batch and the fleeing batch, at any moment of time, must be on two different transporters (or if the fleeing batch is longer than the length of the subsequent conveyors, the fleeing batch must be on different conveyors than the catching up batch). To meet the above requirement, one have to use the right number of conveyors for specific parameters: SAD, Tp, VL1, VL2 . . . , VH1, VH2 . . . . And each successive conveyor should be shorter and shorter.

The following formulas describe the lengths of successive conveyors for an N-section conveyor:

$$L1 = VL1 * Tp \quad N = 1$$

$$L2 = VL2 * (L1 / VH1) \quad N = 2$$

$$L3 = VP3L * (L2 / VH2) \quad N = 3$$

$$L4 = VP4L * (L3 / VP3H) \quad N = 4$$

$$L5 = VP5L * (L4 / VP4H) \quad N = 5$$

$$\ldots \text{ etc.}$$

$$\text{overall } L(N) = VP(N)L * (L(N-1) / VP(N-1)H)$$

where $Tp$ – time of pressing products by the press

In general, as shown in FIG. 7B, based on the example of a system with three conveyors, the conveyor system according to the second embodiment of the invention, may include more than two conveyors, advantageously three variable speed conveyors, connected in series, and at least one controller, wherein the first conveyor is configured to be placed in series with the preceding start conveyor downstream which the system is attached, and the last of at least two conveyors is configured to be placed in series with the target conveyor upstream which the system is attached.

The start conveyor, for example, the press conveyor (10), outputs batches of product at the start speed V0, and the target conveyor, for example, the oven conveyor (50), receives batches of product at the target speed Vt, while the target speed Vt is lower than the start speed V0, The controller is communicatively connected to the first variable speed conveyor (20) and to each at least second variable speed conveyor (30, 40, . . . ). Also in this embodiment, as mentioned earlier, each successive conveyor is shorter, and at least one controller (200) is adapted to control the speeds of all connected conveyors in accordance with the method according to the invention, described below in general terms.

When the start conveyor (10) operates at a start speed of V0, the first variable speed conveyor (20) operates at a high speed VH1 of the first conveyor greater than the V0 start speed, thereby transferring the batch of product from the start conveyor (10) to the first variable speed conveyor (20), while increasing the distance between the rows of products in the batch;

At the same time, at least the second and subsequent variable speed conveyor (30, 40) operates at a high speed of the subsequent conveyor (VH2, VH3, . . . ), the high speed of the subsequent conveyor (VH2, VH3, . . . ) being higher than the high speed of the corresponding preceding conveyor (VH1, VH2 . . . );

After the batch of product has fully departed from the start conveyor (10) onto at least the first variable speed conveyor (20), the speed of the first conveyor (20) is reduced to a low speed of the first conveyor VL1, the low speed VL1 of the first conveyor being lower than the target speed (Vt);

Then, each time, after the batch has fully departed from each conveyor (20, 30, . . . ) of the system (105) to its downstream conveyor (30, 40, . . . ), the speed of that downstream variable speed conveyor (30, 40, . . . ) belonging to the system (105) is reduced to a low speed of each said downstream conveyor VL2, VL3, . . . , the low speed of that each downstream conveyor (30, 40, . . . ) being less than the target speed (Vt) but greater than the low speed (VL1, VL2, . . . , ) of the upstream conveyor (20, 30, . . . ) in order to transfer a batch of product from the first variable speed conveyor (20) to at least the second variable speed conveyor (30, 40, . . . ) and then to the oven conveyor (50) so that on the oven conveyor the rows of products coming from the same batches and different batches have approximately the same distance.

It should be clarified that when a batch has just left the first conveyor 20 of the system 105 in its entirety, its downstream conveyor is the second conveyor 30 of the system 105. If the batch has just left the second conveyor 30 of the system 105 in its entirety, its downstream conveyor is the third conveyor 40 of the system 105.

The conveyor system according to the invention enables programmable changes of the exact settings of the speed sequence and operating time of individual conveyors. They depend on the size of the tortillas produced, the time of the total press cycle, the time the cakes are pressed in the press and the speed of the bakery oven grate feed.

The invention claimed is:

1. A conveyor system containing at least two variable speed conveyors connected in series and at least one controller, the first conveyor being configured to be placed in series with a preceding start conveyor, downstream which the system is attached, and the last of said at least two conveyors being configured to be placed in series with a target conveyor upstream which the system is attached, the start conveyor outputting batches of product at a start speed V0, and the target conveyor receiving the batches of product at a target speed Vt, the target speed Vt being lower than the start speed V0, and wherein the controller is communicatively connected to the first variable speed conveyor and to each of at least the second variable speed conveyor, wherein in the conveyor system each successive conveyor is shorter, and at least one controller is configured so as, when the start conveyor operates at the start speed V0, to operate the first variable speed conveyor in the first step at a high speed of the first conveyor VH1 greater than the start speed V0, thereby transferring a batch of product from the start conveyor to the first variable speed conveyor, at the same time increasing a distance between rows of products in the batch;

to operate in the second step at least the second and subsequent variable speed conveyor at a high speed of the subsequent conveyor (VH2, VH3, . . . ), the high speed of the subsequent conveyor (VH2, VH3, . . . ) being greater than the high speed of the corresponding upstream conveyor (VH1, VH2 . . . );

after the batch of product has fully departed from the start conveyor onto at least the first variable speed conveyor, in the third step, to decrease the speed of the first variable speed conveyor to a low speed of the first conveyor VL1, the low speed VL1 of the first conveyor being lower than the target speed (Vt); and after the batch of product has fully departed from each conveyor of the system onto its downstream conveyor (conveyor, in the fourth and subsequent step, to reduce the speed of said downstream variable speed conveyor belonging to the system to a low speed of each its downstream conveyor VL2, VL3, . . . , the low speed of said each its downstream conveyor being less than the target speed (Vt) but greater than the low speed (VL1, VL2, . . . , ) of its upstream conveyor in order to transfer the batch of product from the first variable speed conveyor to at least the second variable speed conveyor and then to the target conveyor so that on the target conveyor the rows of products coming from the same batches and different batches have approximately the same distance.

2. The system according to claim 1, wherein when the system contains only the first conveyor and the second conveyor the at least one controller is configured to set the speed of the first conveyor and the second conveyor in the first step in such a way, that in a first period t1P1 the first conveyor operates at high speed VH1 in fast mode and the second conveyor operates in slow mode at low speed VL2, then after the first period of t1P1, in the second step, in such a way that in a second period t1P2, the first conveyor continues to operate at high speed VH1 in fast mode and the second conveyor continues to operate at high speed VH2 in fast mode, wherein the relationship between these speeds is described as follows: VP0<VH1<VH2, where VP0 is the speed of the start conveyor preceding the conveyor system; and in the third step in such a way that after the first conveyor and the second conveyor have moved a distance equal to the sum of their lengths L1+L2, within a time t1P1+t1P2 equal to the sum of the first and second periods, in a subsequent third period t2P1, the first conveyor continues to move at the speed VL1 and the second conveyor continues to move at the speed VH2, while in a fourth period, in such a way that after the third period t2P1, in the fourth period t2P2 the first conveyor continues to move at the speed VL1 and the second conveyor continues to move at the speed VL2, the relationship between these speeds being described as follows: VL1<VL2<Vt, where Vt is the speed of the target conveyor.

3. The system according to claim 2, wherein the system includes at least a third conveyor which speed is constant and equal to the speed of the target conveyor.

4. The system according to claim 2, wherein the system includes at least a third conveyor which speed is constant and less than the speed of the target conveyor.

5. The system according to claim 1, wherein each conveyor includes a belt placed on elongated rollers attached to a support frame, to which an axle connected by a drive belt to the rollers and connected to a servomotor, is attached.

6. The system according to claim 1, wherein said controller is connected to other controllers and counters controlling at least the start conveyor and the target conveyor.

7. The system according to claim 1, wherein the length of the first conveyor is L1=VL1*Tp, and the length of the second conveyor is L2=VL2*(L1/VH1), where Tp is the time the products are pressed by the press.

8. The system according to claim 1, wherein the speed VH1 is set according to a press speed V0 and is greater than the press speed V0 by less than 15%.

9. A method of controlling a conveyor system, wherein the conveyor system includes at least two variable speed conveyors connected in series and at least one controller, the first conveyor being configured to be placed in series with a proceeding start conveyor, downstream which the system is attached, and the last of said at least two conveyors is configured to be placed in series with a target conveyor, upstream which the system is attached, the start conveyor outputting batches of product at a start speed V0, and the target conveyor receiving the batches of product at a target speed Vt, the target speed Vt being lower than the start speed V0, and wherein the controller is communicatively connected to the first variable speed conveyor and to each of at least the second variable speed conveyor, and the method is wherein:

in the conveyor system, each successive conveyor is shorter, and when the start conveyor operates at the start speed V0, in the first step the first variable speed conveyor is controlled at a high speed of the first conveyor VH1 greater than the start speed V0, thereby transferring a batch of product from the start conveyor to the first variable speed conveyor, while increasing a distance between the rows of products in the batch;

in the second step, at least a second variable speed conveyor is controlled at a high speed of the subsequent conveyor (VH2, VH3, . . . ), the high speed of the subsequent conveyor (VH2, VH3, . . . ) being greater than the high speed of the corresponding upstream conveyor (VH1, VH2 . . . );

in the third step, after the batch has fully departed from the start conveyor onto at least the first variable speed conveyor, the speed of the first variable speed conveyor is reduced to a low speed of the first conveyor VL1, the low speed VL1 of the first conveyor being lower than the target speed (Vt) and in the fourth step, after the batch has fully departed from each conveyor of the system onto its downstream conveyor, the speed of this downstream variable speed conveyor belonging to the system is reduced to a low speed of each said downstream conveyor VL2, Vl3, . . . , the low speed of that each succeeding conveyor being less than the target speed (Vt) but greater than the low speed (VL1, Vl2, . . . , ) of the preceding conveyor to transfer a batch of product from the first variable speed conveyor to at least the second variable speed conveyor and then to the target conveyor so that on the target conveyor the rows of products coming from the same batches and different batches have approximately the same distance.

10. The method according to claim 9, wherein when the system contains only the first conveyor and the second conveyor, wherein the speed of the first conveyor and the second conveyor is set in such a way that in the first step, during a first period t1P1, the first conveyor operates at a speed VH1 in fast mode and the second conveyor operates at a speed VL2 in slow mode, then after the first period t1P1, in the second step, in a second period t1P2, the first conveyor continues to operate at the speed VH1 in fast mode and the second conveyor continues to operate at the speed VH2 in fast mode, the relationship between these speeds being described as follows: VP0<VH1<VH2, where VP0 is the speed of the conveyor preceding the conveyor system and in the third step, after the first conveyor and the second conveyor have moved a distance equal to the sum of their lengths L1+L2, within a time t1P1+t1P2 equal to the sum of the first and second periods, in a subsequent third period t2P1, the first conveyor moves at the speed VL1 and the second conveyor continues to move at the speed VH2, whereas in the fourth step after the third period of t2P1, in a fourth period of t2P2, the first conveyor continues to move at the speed VL1, and the second conveyor moves at the speed VL2, the relationship between these speeds being described as follows: VL1<VL2<Vt, where Vt is the speed of the target conveyor.

11. The method according to claim 10, wherein the system includes at least a third conveyor whose constant speed is set to the speed of the target conveyor.

12. The method according to claim 10, wherein the system includes at least a third conveyor whose constant speed is set to a lower speed than that of the target conveyor.

13. The method according to claim 1, wherein the length of the first conveyor is L1=VL1*Tp, and the length of the second conveyor is L2=VL2*(L1/VH1), where Tp is the time for pressing the products by the press.

* * * * *